United States Patent [19]

Aldcroft et al.

[11] Patent Number: 5,735,327
[45] Date of Patent: *Apr. 7, 1998

[54] ENLARGED IRON COVER WITH TEXTURED INNER SURFACE

[75] Inventors: Gary Aldcroft, Long Beach; David Hoyt, Culver City, both of Calif.

[73] Assignee: Principle Plastics, Inc., Gardena, Calif.

[*] Notice: The term of this patent shall not extend beyond the expiration date of Pat. No. 5,611,379.

[21] Appl. No.: 530,065

[22] Filed: Sep. 19, 1995

Related U.S. Application Data

[63] Continuation-in-part of Ser. No. 434,517, May 4, 1995, Pat. No. 5,611,379.

[51] Int. Cl.[6] .......................... A63B 57/00; B65D 65/08
[52] U.S. Cl. .......................... 150/160; 206/315.4
[58] Field of Search .......................... 150/159, 160; 206/315.2–315.4, 315.6; 273/194 B

[56] References Cited

U.S. PATENT DOCUMENTS

| | | | |
|---|---|---|---|
| 1,957,577 | 5/1934 | Chapman | 150/160 |
| 2,035,529 | 3/1936 | Bucklin | 150/160 |
| 2,116,655 | 5/1938 | Berrittella | 273/194 B |
| 2,526,985 | 10/1950 | Whitehead | 150/160 |
| 2,608,409 | 8/1952 | Pinkerton | 273/194 B |
| 2,705,039 | 3/1955 | Halter | 150/160 |
| 3,051,210 | 8/1962 | Mesinger | 150/160 |
| 3,255,794 | 6/1966 | Morse | 150/160 |
| 3,478,779 | 11/1969 | Hoyt, Jr. | 150/160 |
| 4,213,614 | 7/1980 | Philippi | 150/160 X |
| 4,971,126 | 11/1990 | Borenstein | 150/160 |
| 5,000,238 | 3/1991 | Zeller | 206/315.4 |
| 5,050,655 | 9/1991 | Borenstein | 150/160 |
| 5,105,863 | 4/1992 | Cirone | 150/160 |
| 5,117,884 | 6/1992 | Diener et al. | 150/160 |
| 5,294,127 | 3/1994 | Keelan | 150/160 X |
| 5,345,987 | 9/1994 | Hagar | 150/160 |
| 5,415,213 | 5/1995 | Difner et al. | 150/160 |

FOREIGN PATENT DOCUMENTS

| | | | |
|---|---|---|---|
| 1091264 | 12/1980 | Canada | 206/315.2 |
| 1360058 | 7/1974 | United Kingdom | 206/315.2 |

*Primary Examiner*—Sue A. Weaver
*Attorney, Agent, or Firm*—James E. Brunton

[57] ABSTRACT

A head cover for an iron golf club has an enlarged cover section which fits over the head of irons of different sizes. The cover section includes an internal cavity having a rough texture surface with an enlarged open mouth through which the head passes upon placing the cover section over the head and a protector section which covers, at least partially, the hosel member of the shaft when the head is received within the cavity. A clip near the open mouth has legs which extend through openings formed in the cover and expand with the shaft of the iron golf club being pushed into the cavity and retracts to hold the shaft when the head is received within the cavity.

15 Claims, 2 Drawing Sheets

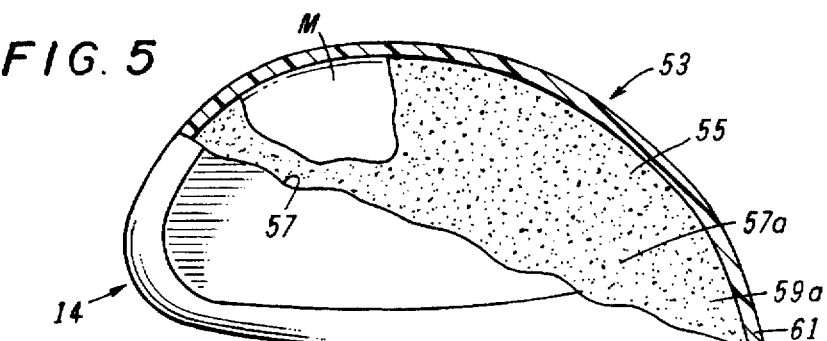
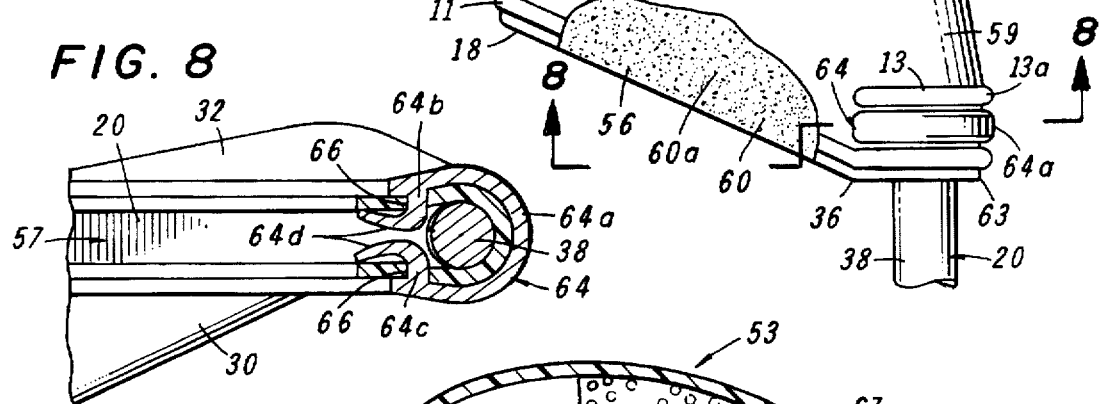
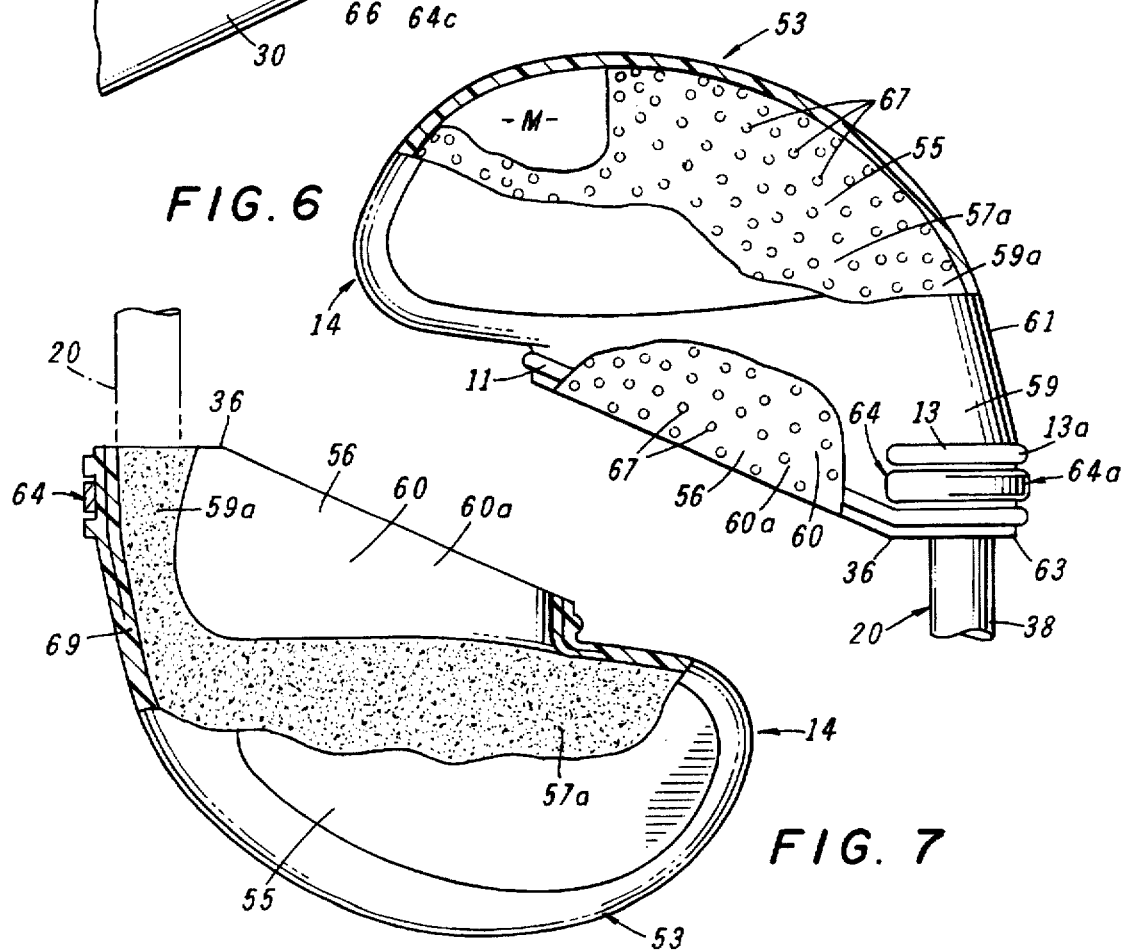

ENLARGED IRON COVER WITH TEXTURED INNER SURFACE

BACKGROUND OF THE INVENTION

This is a Continuation-In-Part Application of application Ser. No. 08/434,517 filed May 4, 1995 now U.S. Pat. No. 5,611,379.

FIELD OF THE INVENTION

This invention relates to a cover for the head of an iron golf club.

BACKGROUND OF THE INVENTION

Covers for irons are popular, but they usually only protect the face of the iron. It is desirable to extend the cover along the shaft of the iron so that it covers the hosel member of the shaft. U.S. Pat. No. 5,117,884 illustrates an iron cover which is designed to cover the hosel member of the shaft in addition to the head of the iron. It is also desirable to have the cover fit all sizes of irons, that is, from the One Iron through the Wedge. This requires the use of an enlarged open mouth through which the head of the iron passes when the cover is placed on the iron. As a consequence of protecting the hosel member and using an enlarged open mouth, it is difficult to retain the cover in position on the head of the iron, so that it does not accidentally fall off during use.

SUMMARY OF THE INVENTION

It is an objective of this invention to provide a cover for an iron golf club which fits all the different sized irons, protects the hosel member of the shaft of the iron, and is retained in position until manually removed by the golfer.

The iron cover of this invention has several features, no single one of which is solely responsible for its desirable attributes. Without limiting the scope of this invention as expressed by the claims which follow, its more prominent features will now be discussed briefly. After considering this discussion and particularly after reading the section entitled, "DETAILED DESCRIPTION OF THE PREFERRED EMBODIMENT", one will understand how the features of this invention provide its benefits, which include protection of the hosel member, and fitting all sized irons.

The first feature of the head cover of this invention is that it includes an enlarged cover section which fits over the head of irons of different sizes. The cover section has an internal cavity with an enlarged open mouth through which the head of the iron passes upon placing the cover section of the head and a protector section which covers, at least partially and preferably substantially all, the hosel member when the head is received within the cavity.

The second feature is a clip member near the open mouth and the protector section which expands with the shaft of the iron golf club being pushed into the cavity and retracts to hold the shaft when the head is received within the cavity. The clip member is preferably on the exterior of the protector section adjacent the open mouth. There is a retainer member which holds the clip member in position. The clip member includes a base having opposed ends and a pair of legs. Each leg extends outward in the same direction for an end of the base, so that it has a generally U-shaped configuration.

The third feature is that the protector section has a pair of opposed openings near the open mouth and the clip member has a pair of pin elements. Each pin element extends through one of the openings, and the shaft engages the pin elements to expand the clip member when the shaft is pushed into the cavity.

Still another highly important objective of the invention is to provide a cover for an iron golf club of the character described in the preceding paragraphs in which all or a substantial portion of the interior surface of the cover exhibits a rough texture which facilitates entry of the head of the iron golf club into the cover.

DESCRIPTION OF THE DRAWINGS

The preferred embodiment of this invention, illustrating all its features, will now be discussed in detail. This embodiment depicts the novel and non-obvious iron cover of this invention as shown in the accompanying drawing, which is for illustrative purposes only. This drawing includes the following figures (FIGS.), with like numerals indicating like parts:

FIG. 5 is a side-elevational view of an alternate embodiment of the iron cover of this invention partly broken away to show internal construction.

FIG. 6 is a side-elevational view of still another form of the iron cover of the invention partly broken away to shown internal construction.

FIG. 7 is a side-elevational view of yet another embodiment of the invention partly broken away to show internal construction.

FIG. 8 is a fragmentary, cross-sectional view taken along lines 8—8 of FIG. 5 showing an alternate form of retaining clip.

DETAILED DESCRIPTION OF THE PREFERRED EMBODIMENT

Figure 1:
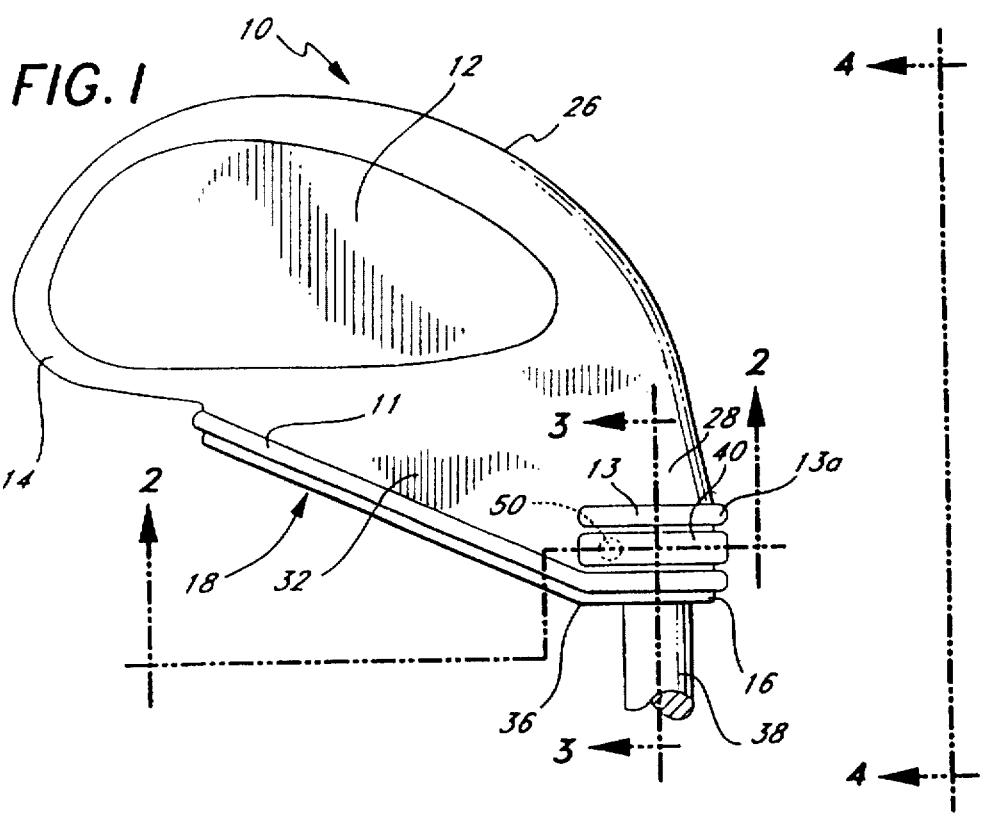
FIG. 1 is a side-elevational view of the iron cover of this invention.
Figure 2:
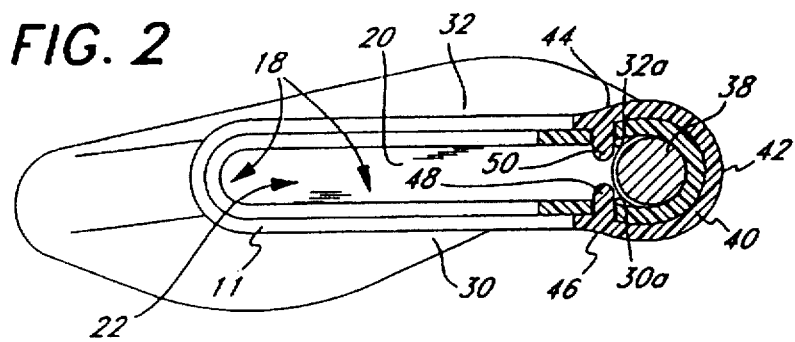
FIG. 2 is a cross-sectional view taken along line 2—2 of FIG. 1.
Figure 3:
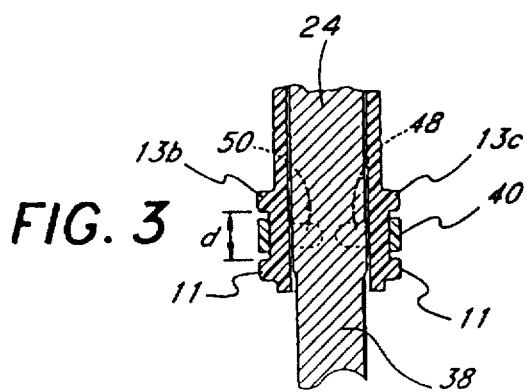
FIG. 3 is a cross-sectional view taken along line 3—3 of FIG. 1.
Figure 4:
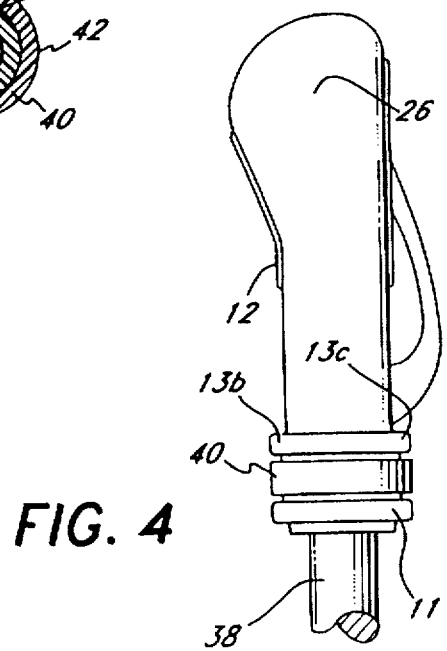
FIG. 4 is a view taken along line 4—4 of FIG. 1.

As depicted in FIGS. 1 through 3, the iron cover 10 of this invention includes an enlarged cover section 12 which has a forward end 14, a rear end 16, a back side 26 extending between the forward and rear ends, opposed side walls 30 and 32 connected to the back side, and an enlarged, elongated open mouth 18 extending between the forward and rear ends. An iron 20 (only partially shown) is received within an enlarged cavity 22 within the cover section 12. Thus, the head of the iron 20 is completely covered when the iron cover 10 is placed on the head of the iron. There is a collar 11 along the perimeter of the open mouth that circumscribes the open mouth, and a U-shaped flange 13 that is spaced from the collar a short distance d. The U-shaped flange 13 has a base 13a which extends over the back side 26, and a pair of opposed legs 13b and 13c which, respectively, extend over the side walls 30 and 32. In each side wall 30 and 32 is an opening 30a and 32a, respectively. These openings 30a and 32a are directly opposed to each other.

In accordance with one feature of this invention, the cover section 12, and the cavity 22 within this section, are large enough to accept irons of different sizes, so that one size cover 10 fits all sizes of irons. The open mouth 18 is sufficiently large so that the irons easily pass through the open mouth 18 into the cavity 22. Typically, the open mouth 18 is longer than it is wide, and has a length of from about 2 to about 4 inches. The cover section 12 is preferably made using conventional slush molding techniques from a polymeric material such as, for example, polyvinyl chloride. This gives the cover section 12 flexibility.

In accordance with another feature of this invention, the hosel member 24 of the iron 20 is covered. In the preferred embodiment depicted, the entire hosel member 24 is covered, although in some embodiments of this invention it may only be partially covered. To provide this feature, the cover section 12 includes a hosel protector section 28. The hosel protector section 28 comprises the back side 26 of the cover section 12 adjacent the rear end 16, and the lower portions of the side walls 30 and 32 of the cover section 12. The rear end 16 is lower than the forward end 14 as viewed in FIG. 1, and the open mouth 18 extends along a straight, but slanting, line between the forward end 14 and an intermediate point 36 that is below the lower end of the hosel member 24 when the head of the iron 20 is lodged within the cavity 22 of the cover 10. The open mouth 18 then extends along a straight line between the intermediate point 36 and the rear end 16. The distance between the intermediate point 36 and the rear end 16 is relatively short compared to the total length of the open mouth, and is only about twice the diameter of the shaft 38 of the iron 20. Typically, this distance between the intermediate point 36 and the rear end 16 is from about 0.50 to about 1 inch.

In order to prevent the cover 10 from slipping off the head of the iron 20, a clip 40 is employed to hold the cover to the iron. This clip 40 has a base 42 having opposed ends with a leg 44 and 46, respectively, at each end. Each leg 44 and 46 extends outward in the same direction from the ends of the base 42, thus, the clip 40 has a generally U-shaped configuration. There are a pair of pins 48 and 50 at each end of the legs 44 and 46 that point inward towards each other. The clip 40 fits over the exterior of the cover section 12 near the rear end 16, and it is held in position by a portion of the collar 11 between the intermediate point 36 and the rear end 16 and the U-shaped flange 13. The width of the clip 40 is slightly less than the distance d. Thus, the portion of the collar 11 between the intermediate point 36 and the rear end 16 and the U-shaped flange 13 serve as a retainer that prevents the clip 40 from moving up and down along the back side 26 of the cover section 12. The clip 40 is on the exterior of the cover 10, and the pins 48 and 50 slip into openings 30a and 32a when they are aligned with these openings. The clip 40 is spring biased, so that when the head of the iron 20 is inserted into the open mouth 18, the shaft 38, or the hosel member 24 which is part of the shaft, engages the pins 48 and 50 to expand the clip 40, pushing the legs 44 and 46 apart. As soon as the shaft 38 passes the pins 48 and 50, the clip 40 returns to its normal condition shown in FIG. 2. Thus, the cover 10 is held by the clip 40 to the shaft 38.

Referring now to FIGS. 5 through 7, several alternate forms of the invention are there shown. These forms of the invention are similar in most respects to that shown in FIGS. 1 through 4 and like numerals are used in FIGS. 5 through 7 to identify like components. The principal difference between the head cover shown in FIGS. 1 through 4 and those shown in FIGS. 5 through 7 resides in the design of the retainer clip and the character of the interior surface of the cover. In this regard, experience by applicant has shown that if all or part of the interior surface of the cover is provided with a rough texture, insertion of the golf club head into the cover is greatly facilitated. As used herein the term "rough texture" means a surface texture having a multiplicity of upstanding protuberances which will engage the surface of the golf club head in a manner to facilitate entry to the head into the cover.

Turning first to FIGS. 5 and 8, the cover 53 of this first alternate form of the invention comprises an enlarged cover section 55 and a skirt section 56. Skirt section 56 has an elongated open mouth 18 extending between the forward and rear ends of the cover. In the manner previously described, an iron 20 (only partially shown) is received within an enlarged cavity 57 formed within the cover section 55.

An important feature of this latest form of the invention resides in the fact that the interior or internal surface 57a of cover section 55 is formed with a rough texture which materially facilitates entry of the golf club head into cavity 57 which is defined by internal surface 57a.

As in the earlier described embodiment, there is a collar 11 along the perimeter of the skirt section that circumscribes the open mouth 18, and a U-shaped flange 13 that is spaced from the collar a short distance. The U-shaped flange 13 has a base 13a which extends over the back side of the cover, and a pair of opposed legs extend over the side walls.

In this latest form of the invention, the hosel member of the iron 20 is also covered. To provide this covering, the skirt section 56 includes a hosel protector section 59 which includes a portion of the back side 61 of the cover section 55 adjacent the rear end 63. The combination of the hosel protector section and the skirt section 56 is herein referred to as the protector section of the cover which is generally designated in the drawings by the numeral 60. As previously discussed, the rear end of the protector section is lower than the forward end, and the open mouth 18 extends along a straight, but slanting, line between the forward end and an intermediate point that is below the lower end of the hosel member when the head of the iron 20 is lodged within the cavity of the cover. The open mouth 18 then extends along a straight line between the intermediate point and the rear end of the cover.

In order to prevent the cover from slipping off the head of the iron 20, a clip 64 is employed to hold the cover to the iron. This clip 64 is of a slightly different construction from that previously described and includes a base 64a and a pair of legs 64b and 64c. Each leg extends outward in the same direction from the ends of the base 64a to form a clip which has a generally U-shaped configuration. Provided proximate the inboard end of each leg is an internal locking extremity 64d. Locking extremities extend through apertures 66 formed in the side walls of the protector section and firmly grip the inner wall surfaces of the cover in the manner shown in FIG. 8. With this construction, extremities 64d hold the CIP in place and prevent it from moving up and down along the back side of the cover.

Hosel protector section 59 includes an interior or internal surface 59a, which like the interior surface 57a of the cover section 55 and the interior surface 60a of the protector section 60, is provided with a rough texture which further facilitates entry of the golf club head into the device. The exterior surface of the protector section 60 is, on the other hand, provided with a smooth substantially texture-free surface.

While the rough texture on the internal surfaces of the cover section 55 and the protector section 60 can be provided in several ways, a novel slush coating technique is preferred. This technique, which comprises the method of one form of the present invention involves the use of a heated mold the cavity of which generally corresponds to the exterior shape of the cover. The mold "M" (FIG. 6) is of conventional construction having an access port into which a mixture of plasticizer and polyvinyl chloride resin can be poured. Prior to pouring the mixture, sometimes referred to in the trade as a plastisol, the mold is heated to a temperature of between about 80 degrees and 220 degrees Fahrenheit. In one form of the invention, the mixture of plasticizer and polyvinyl chloride resin is poured into the access port of the mold to substantially fill the cavity volume. As the plastisol engages the heated interior surface of the mold, a gelatinous first skin will be formed. After this skin is formed, the remainder of the first mixture over and above that required to form the first skin is poured from the access port of the mold. Following this step, a second mixture of plasticizer, polyvinyl chloride resin and particle blending resin is poured into the access port to at least partially fill the internal volume defined by the first skin. This second mixture engages the heated first skin and, in so doing, forms a second skin.

In the preferred form of the invention, a slip agent also forms a part of the section mixture. A suitable slip agent for this purpose is sold under the name and style, "SLIPQUICK" by The Synpro Company of Texas. Other readily commercially available, slip agents can also be used in the practice of the preferred form of the invention.

After the remaining portion of the second mixture is poured from the access port of the mold, the mold along with the first and second skins formed therewithin are heated in a temperature-controlled oven at an elevated temperature sufficient to cause the first and second skins to cure and to integrate into a cover defining wall having an interior, rough textured surface and an exterior surface substantially corresponding to the shape of the mold cavity. After the first and second skins have been appropriately cured, the cover thus formed is removed from the mold.

The degree of roughness of the interior surface of the cover varies depending upon the nature of the particle blending resin used to form the second mixture. If the particle-blending resin contains relatively small particles, the degree of roughness of the interior surface of the cover will be less coarse than if large particles are used in the formation of the particle blending resin.

Turning once again to the drawings, and particularly to FIG. 5, it will be noted that both the interior surface 57a of the cover section 55 and the interior surface 60a of the protector section are provided with a texture consistent with the use of a particle blending resin having relatively small particles. On the other hand, by referring to FIG. 6, it can be seen that in an instance wherein the particle-blending resin contains relatively large particles, the inner surfaces 57a and 60a exhibit a multiplicity of larger upstanding protuberances 67 on the inner surface of the cover thereby making the texture thereof of quite rough.

Turning next to FIG. 7, yet another form of the invention is there shown. This form of the invention is identical in most respects to that shown in FIGS. 5 and 6 save that the interior surface of the cover includes a rough textured portion which is not co-extensive with the entire peripheral extent of the inner surface of the cover. Rather, as illustrated in FIG. 7, while the interior surface 57a of the cover section 55 is substantially of a rough texture, the majority of the surface 60a of the protector section 60 is generally smooth.

In producing the cover shown in FIG. 7, the method of the invention is similar in many respects to the method described in connection with the production of the covers illustrated in FIGS. 5 and 6. More particularly, after the mold "M" has been heated to an elevated temperature of between 80 and 220 degrees Fahrenheit, a first mixture of plasticizer and polyvinyl chloride resin is poured into the access port to substantially fill the cavity volume to form a gelatinous first skin. The remaining portion of the first mixture is then poured from the mold leaving the first gelatinous skin within the mold cavity. This first skin is once again substantially co-extensive with the mold cavity and has a surface generally corresponding to the external surface of the cover.

The next step in the latest form of the method of the invention is to pour a second mixture of plasticizer, polyvinyl chloride resin and particulate blending resin into the access port. However, in this instance, the internal volume defined by the first skin is only partially filled with the first mixture. More particularly, this volume is filled only to an extent to substantially cover section 55 which is that portion of the head cover that surrounds the face and back of the golf club iron.

After the second skin is formed, the remainder of the second mixture is carefully poured from the mold in a manner such that the second mixture engages only the spline portion 69 of the second skin as it is poured from the mold, but does not come in contact with a substantial portion of the side walls of protector section 60. By pouring the remainder of the second mixture from the mold in this manner, the uniquely textured surface illustrated in FIG. 7 is produced. As illustrated in FIG. 7, in this last form of the invention, the interior surface of the cover section exhibits a rough texture as does surface 59a while the majority of the protector section 60 exhibits a relatively smooth internal surface identified in FIG. 7 as 60a. As before, the degree of coarseness of the internal surface depends primarily upon the size of the particles used to produce the particle blending resin that comprises a part of the second mixture.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A head cover for an iron golf club which has a head connected to a shaft by a hosel member, said head cover including:

(a) an enlarged cover section which fits over the head of irons of different sizes, said cover section having an interior surface and including an internal cavity, an enlarged open mouth through which the head passes upon placing the cover section over said head, and a protector section having openings therein and an interior surface which covers, at least partially, the hosel member when the head is received within the cavity, said interior surface of said cover section being of a rough texture to facilitate entry of the head of the iron golf club; and (b) means defining a clip connected to said protector section near the open mouth thereof said means defining a clip comprises a clip having legs extending through said openings in said protector section which expand with the shaft of the iron golf club being pushed into the cavity and retract to hold the shaft when the head is received within the cavity.

2. The head cover of claim 1 in which said protector section having an interior surface which is of a rough texture to further facilitate entry of the iron golf club head.

3. The head cover of claim 2 in which said rough texture comprises a multiplicity of protuberances extend from said interior surface of said cover section and said interior surface of said protector section.

4. The head cover of claim 2 in which said clip includes a base and in which said legs extend outward from said base, each leg having an inturned extremity disposed in engagement with said interior surface of said protector section.

5. A head cover for an iron golf club which has a head connected to a shaft by a hosel member, said head cover including:
   (a) an enlarged cover section which fits over the head of irons of different sizes, said cover section having an interior surface and including an internal cavity with an enlarged open mouth through which the head passes upon placing the cover section over said head and a protector section having openings therein and an interior surface which covers at least partially the hosel member when the head is received within the cavity, said interior surfaces of both said cover section and said protector section being of a rough texture throughout substantially the entire peripheral extent thereof; and
   (b) means defining a clip connected to said protector member near the open mouth thereof, said means defining a clip comprising a clip having a base and a pair of outwardly extending legs which extend through said openings and which expand with the shaft of the iron golf club being pushed into the cavity and retracts to hold the shaft when the head is received within the cavity.

6. The head cover of claim 5 in which said cover section has a predominantly smooth outer surface throughout.

7. The head cover of claim 6 in which said protector section has a predominantly smooth outer surface throughout.

8. The head cover of claim 5 in which said pair of legs have an inturned extremity for engagement with said internal surface of said protector section.

9. The head cover of claim 8 where said clip has a generally U-shaped configuration.

10. A head cover for an iron golf club which has a head connected to a shaft by a hosel member, said head cover including:
    (a) an enlarged cover section which fits over the head of irons of different sizes, said cover section having:
        (i) an internal surface defining an internal cavity with an enlarged, elongated open mouth through which the head passes upon placing the cover section over said head, said internal surface having a rough textured surface comprising a multiplicity of upstanding protuberances; and
        (ii) a protector section which covers substantially all the hosel member when the head is received within the cavity, said protector section having a pair of openings therein and an internal and an external surface; and
    (b) a means defining clip connected to said protector section near the open mouth thereof said clip having legs which pass through said openings and which expand with the shaft of the iron golf club being pushed into the cavity and retracts to hold the shaft when the head is received within the cavity.

11. The head cover of claim 10 in which said internal surface of said protector section has a rough textured surface comprising a multiplicity of upstanding protuberances.

12. The head cover of claim 11 where the cover section is made of a polymeric material.

13. The head cover of claim 11 in which said cover section includes an exterior surface which is predominantly smooth.

14. The head cover of claim 13 in which said external surface of said protector section is predominantly smooth.

15. The head cover of claim 13 in which said clip includes a base portion with said legs extending from said base portion, each said leg having an inturned extremity.

* * * * *